United States Patent
Kasralikar et al.

(10) Patent No.: US 7,817,549 B1
(45) Date of Patent: Oct. 19, 2010

(54) FLEXIBLE FLOW-AGING MECHANISM

(75) Inventors: Rahul Kasralikar, San Jose, CA (US); Jeffrey Fowler, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 629 days.

(21) Appl. No.: 11/479,176

(22) Filed: Jun. 30, 2006

(51) Int. Cl.
*H04L 12/26* (2006.01)

(52) U.S. Cl. .................... 370/232; 370/235

(58) Field of Classification Search ............ 370/465, 370/392, 241, 229, 389, 232, 252, 235; 709/224, 709/239; 711/133, 159
See application file for complete search history.

(56) References Cited

U.S. PATENT DOCUMENTS

| | | | |
|---|---|---|---|
| 6,272,598 B1* | 8/2001 | Arlitt et al. ............... 711/133 |
| 6,909,724 B1* | 6/2005 | Albert et al. ............... 370/465 |
| 6,954,739 B1 | 10/2005 | Bouillet et al. |
| 7,317,693 B1* | 1/2008 | Roesch et al. ............... 370/252 |
| 7,349,332 B1* | 3/2008 | Srinivasan et al. .......... 370/229 |
| 7,369,557 B1* | 5/2008 | Sinha ........................ 370/392 |
| 7,389,537 B1 | 6/2008 | Callon et al. |
| 7,394,756 B1 | 7/2008 | Cook |
| 7,408,932 B2 | 8/2008 | Kounavis et al. |
| 7,464,407 B2 | 12/2008 | Nakae et al. |
| 7,478,156 B1* | 1/2009 | Pereira ........................ 709/224 |
| 7,489,640 B2* | 2/2009 | Corley ....................... 370/241.1 |
| 2002/0083175 A1 | 6/2002 | Afek et al. |
| 2003/0204621 A1* | 10/2003 | Poletto et al. ............... 709/239 |
| 2005/0213570 A1* | 9/2005 | Stacy et al. ................. 370/389 |
| 2006/0146708 A1* | 7/2006 | Kanazawa ................... 370/232 |
| 2006/0187836 A1* | 8/2006 | Frey et al. ................... 370/235 |
| 2006/0212572 A1 | 9/2006 | Afek et al. |
| 2007/0204117 A1* | 8/2007 | Van Riel et al. ............ 711/159 |
| 2007/0268829 A1 | 11/2007 | Corwin et al. |

OTHER PUBLICATIONS

Non-Final Office Action for U.S. Appl. No. 11/479,177 Mailed Mar. 19, 2009, 21 pages.
Final Office Action for U.S. Appl. No. 11/479,177, Mailed Oct. 6, 2009, 13 pages.
Non-Final Office Action for U.S. Appl. No. 11/479,177, Mailed Dec. 23, 2009, 14 pages.

* cited by examiner

*Primary Examiner*—Steven H Nguyen
*Assistant Examiner*—Syed Bokhari
(74) *Attorney, Agent, or Firm*—Blakely, Sokoloff, Taylor & Zafman

(57) ABSTRACT

A flow identifier is stored in a memory to identify a network flow. The memory is capable of storing multiple flow identifiers for multiple flows. Packet statistics are collected for each of the flows. The packet statistics are compared and a flow identifier is subsequently selected and removed from the memory.

20 Claims, 2 Drawing Sheets

FLEXIBLE FLOW-AGING MECHANISM

FIELD

Embodiments of the invention relate to the handling of packet flows through a network switch, and particularly to flow-aging in a switch.

BACKGROUND

A network flow, also referred to herein as simply a "flow," is a sequence of network packets sharing certain characteristics. A common set of characteristics used to define a flow is referred to as a "5-tuple." A 5-tuple is a sequence of packets sharing the same source and destination address, source and destination port, and protocol (5 values total, hence the "5-tuple" label.) Other combinations of flow characteristics may also be used to define a network flow.

Many network switches employ filters or other devices/mechanisms to control the flow of network traffic through the switch. One approach to filtering and/or control is a flow-based approach. In one example of a flow-based approach, a list/table of various flow entries (e.g., as defined by the 5-tuple) is maintained at the switch. When a packet enters the switch, the packet is checked to see if it matches a flow entry in the list/table. Based on the results of checking the packet, an action is then taken on the packet (e.g., blocking, forwarding, redirecting, etc.).

The list/table of flow entries is typically stored in a finite memory/cache. Thus, only a limited number of flow entries can be stored at a time. When the memory becomes full of entries, a decision must be made to determine how to handle new entries seeking inclusion in the list/table (i.e., whether to add or remove an entry from the list/table). This decision-making process and the subsequent actions associated with removing flow entries to make room for new entries is referred to herein as aging, or flow-aging.

Existing flow-aging mechanisms rely on packet counters or hardware refresh bits to decide whether a flow is to be aged out or not. These mechanisms are limited in that the aging process is typically based on simple packet-difference arithmetic, providing very little flexibility for aging out flows.

SUMMARY

A flow identifier for a network flow is received from an intrusion prevention system (IPS) device and a request is made for the flow identifier to be stored in a memory. The memory is capable of storing multiple flow identifiers for multiple flows and provides a basis for forwarding packets directly through a switch. Packet statistics (beyond basic packet counts from a single counter) are collected for each of the flows. Rather than relying on simple packet counts or status bits for a single flow, the packet statistics for the different flows are analyzed and corresponding flows are prioritized. Based on the prioritization and a policy, a determination is made whether to remove a flow identifier from memory to allow the received flow identifier to be added.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
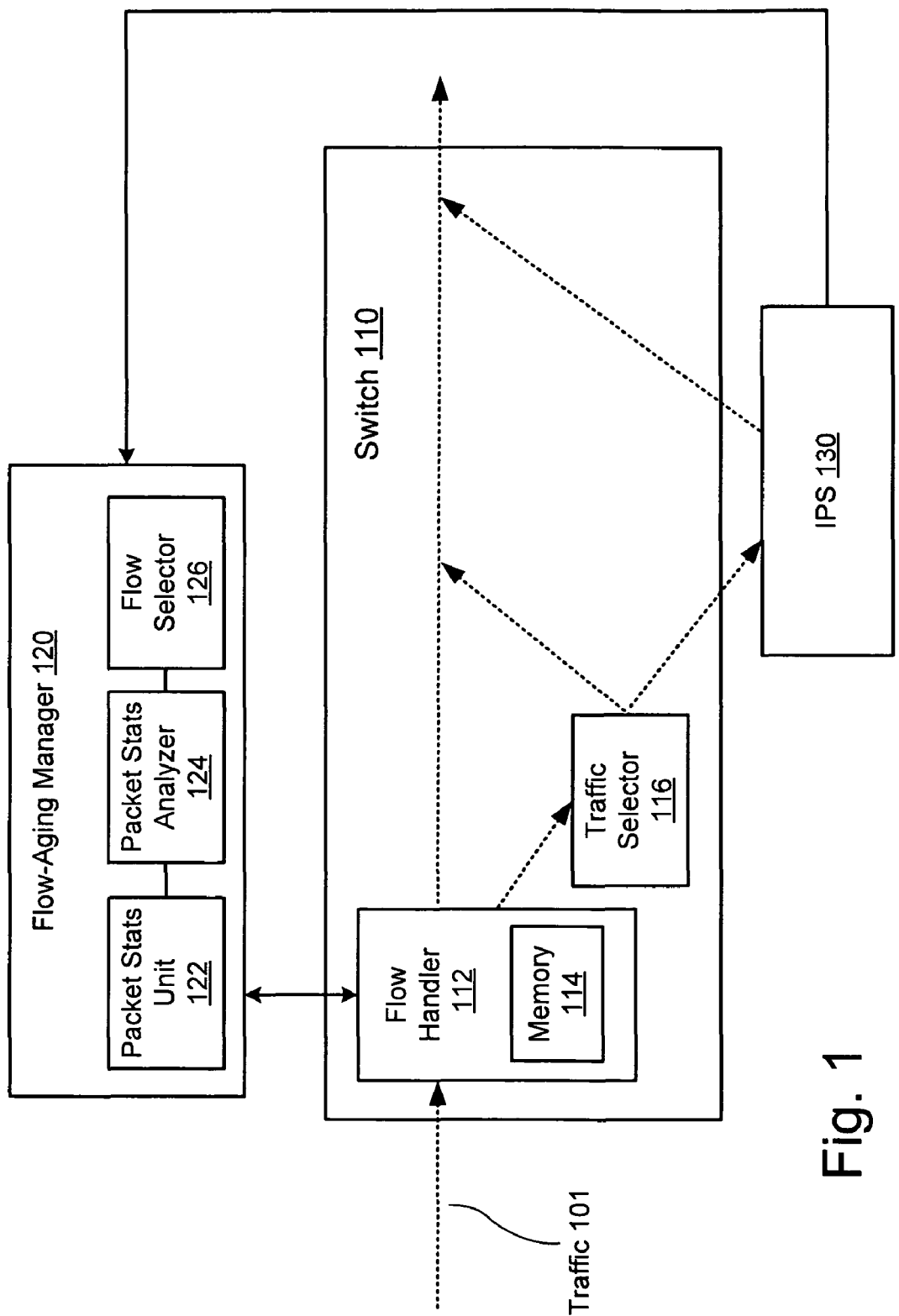
FIG. 1 is a block diagram of an embodiment of the invention having a flow-aging manager.

A network switch operates in conjunction with an external intrusion prevention system (IPS) to provide network security (e.g., threat detection and/or mitigation). The switch redirects traffic to the IPS for further inspection, sometimes referred to as "deep packet inspection." Most external IPS devices do not have the bandwidth capabilities to inspect traffic in real-time without significantly throttling or bottlenecking the traffic. Thus, switches typically redirect only a portion of the overall traffic to an IPS device (based on a policy, a set of rules or parameters, etc.)

The IPS device analyzes the redirected traffic to determine whether a particular flow is good (e.g., safe, not a threat, etc.) or bad (e.g., viruses, worms, denial of service (DoS) attacks, etc.). These determinations are communicated back to the switch to provide a basis for future redirection decisions. For example, an IPS device might determine that a particular flow (e.g., flow B) is a good flow. The IPS sends a notification to the switch identifying flow B as a good flow. The switch stores a flow identifier (e.g., a 5-tuple) for flow B in a memory. Thus, once a flow identifier for flow B is stored in the memory, any subsequently received packets associated with flow B will generate a match with the flow B identifier in memory, causing the switch to forward the flow B packets through the switch without redirecting them to the IPS device (because it has already been determined that flow B packets are safe for the network).

The memory used for storing flow identifiers can be any memory (e.g., random access memory (RAM), read-only memory (ROM), flash memory, etc.). In one embodiment the memory used to store the flow identifiers is a content addressable memory (CAM). In another embodiment, a ternary CAM, or TCAM, is used to store the flow identifiers. Given that a memory has a finite number of storage locations, the addition of new flow identifiers eventually causes the memory to become full. When the memory is full, new flow identifiers cannot be automatically added to the memory. Instead, a decision must be made at the switch either to remove a flow identifier from the memory (to make room for a new flow identifier) or to deny the new flow identifier from being added to the memory. A flow-aging mechanism handles the decision-making process for adding and/or removing flow identifiers from the memory.

In one embodiment, flow-aging decisions are based both on dynamically updated packet statistics collected at the switch and a flow-aging policy or set of rules. Packet statistics may include cumulative packet counts for different flows, a change or delta in a packet count over a time interval, a ratio of two cumulative packet counts, a ratio of a change or delta in two packet counts over a time interval, etc. The variety of packet statistics provides flexibility to the decision-making process for adding and/or removing flow identifiers from the memory. In another embodiment, the flow-aging mechanism compares existing flows or other information such as forwarding entries from a media access control (MAC) table, a routing table, access control lists (ACLs) or other rules installed by other applications to aid in the decision-making process for adding/removing flow identifiers from the memory.

FIG. 1 illustrates an embodiment of the invention having a flow-aging manager 120. Traffic 101 enters switch 110 where it is received by flow handler 112. Flow handler 112 initially examines traffic 101 to find packets having a recognized flow identifier. A table/list of flow identifiers is stored in memory 114. Memory 114 can be any memory/cache, including ROM, RAM, flash memory, CAM, etc. In one embodiment, the table/list of flow identifiers identifies flows that have been designated as "good" flows (discussed in more detail below). In other embodiments, the table/list identifies flows that meet other specified criteria.

When a packet enters flow handler 112, the packet is examined to determine its flow identifier (e.g., the 5-tuple that includes source and destination address, source and destination port, and IP protocol). Flow handler 112 then compares this flow identifier against entries stored in memory 114. If flow handler 112 finds a matching entry in memory 114, the packet is associated with a good flow and is forwarded through switch 110 without being redirected. If, on the other hand, flow handler 112 does not find a matching entry in memory 114, the packet is redirected to traffic selector 116.

Traffic selector 116 monitors various conditions in traffic 101 and includes various rules/policies for the selection and redirection of flows to the external IPS device 130. IPS 130 performs deep packet inspection to determine whether a packet/flow is safe or whether it is a threat to the stability/integrity/functionality of the network and/or its instrumentalities. If IPS 130 determines that a particular flow is safe for the network, it is considered a "good" flow. IPS 130 notifies flow-aging manager 120 of the good flow and flow-aging manager 120 forwards a flow identifier associated with the good flow to flow-handler 112. Flow-handler 112 attempts to store the flow identifier in memory 114. Assuming space is available for a new entry, the flow identifier is stored in memory 114. Once the flow identifier for the good flow is stored in memory 114, future incoming packets associated with the good flow are forwarded directly through the switch 110.

If memory 114 is full, new flow identifiers cannot be added as entries unless an existing entry is deleted/removed from memory 114, referred to herein as "aging out" a flow. Flow-aging manager 120 manages the flow-aging process and creates a flexible flow-aging environment where policies and/or rules affecting decisions and/or selections can be adapted to changing network conditions and/or a changing network environment. Thus, flow-aging manager 120 contributes to increasing efficiency in the forwarding of packets/traffic in a switch.

In particular, packet statistics unit 122 collects/maintains packet statistics for incoming traffic 101. The packet statistics can include, but are not limited to, cumulative packet counts for one or more flows, a change or delta in a packet count over a time interval, a ratio of two cumulative packet counts, and/or a ratio of a change or delta in two different packet counts over a time interval.

Packet statistics unit 122 may also collect statistics for reverse/outbound traffic associated with a flow. For example, in one embodiment, packet statistics unit 122 tracks the number of incoming Transmission Control Protocol (TCP) synchronize (SYN) packets received for a particular flow. Meanwhile, packet statistics unit 122 can also track the number of outbound TCP SYN-acknowledge (SYN-ACK) packets associated with the flow.

A packet statistics analyzer 124 analyzes the collected packet statistics based on a policy or set of rules. The policy or set of rules can be manually updated by a network administrator or it can be dynamically updated based on network conditions. Packet statistics analyzer 124 prioritizes flows using the packet statistics and the policy (or set of rules). For example, in one embodiment, packet statistics analyzer 124 uses "packet count over time" statistics and gives higher priority to a high volume flow than to a low volume flow. Or, in another embodiment, priority may be given to a particular type of flow (e.g., mail traffic, file transfer protocol (FTP) traffic, structured query language (SQL) traffic, etc.).

Flow selector 126 selects flows to be aged out based on the packet statistics analysis and the flow-aging policy. When a flow identifier is presented for addition into memory 114, flow selector 126 selects an entry, if any, to be removed from memory 114 so that the new flow identifier can be added. Based on the policy, flow selector 126 may determine not to remove any entries from the table, thus denying the addition of the new flow identifier to the table.

When the flow selector 126 selects an entry for removal from memory 114, the selection is communicated to flow handler 112 and the selected flow identifier is removed from memory 114. Once a flow identifier is removed from memory 114, future incoming packets associated with the removed flow identifier will be redirected to traffic selector 116, and possibly IPS 130, instead of being forwarded directly through switch 110. If packets associated with the removed flow identifier are redirected and later inspected by IPS 130 and the corresponding flow is again tagged as a good flow, the removed flow identifier will be forwarded to flow-aging manager 120 and evaluated for re-entry into memory 114. Depending on the network conditions and/or associated flow-aging policies/rules, the previously removed flow identifier may or may not be re-admitted into memory 114.

Figure 2:
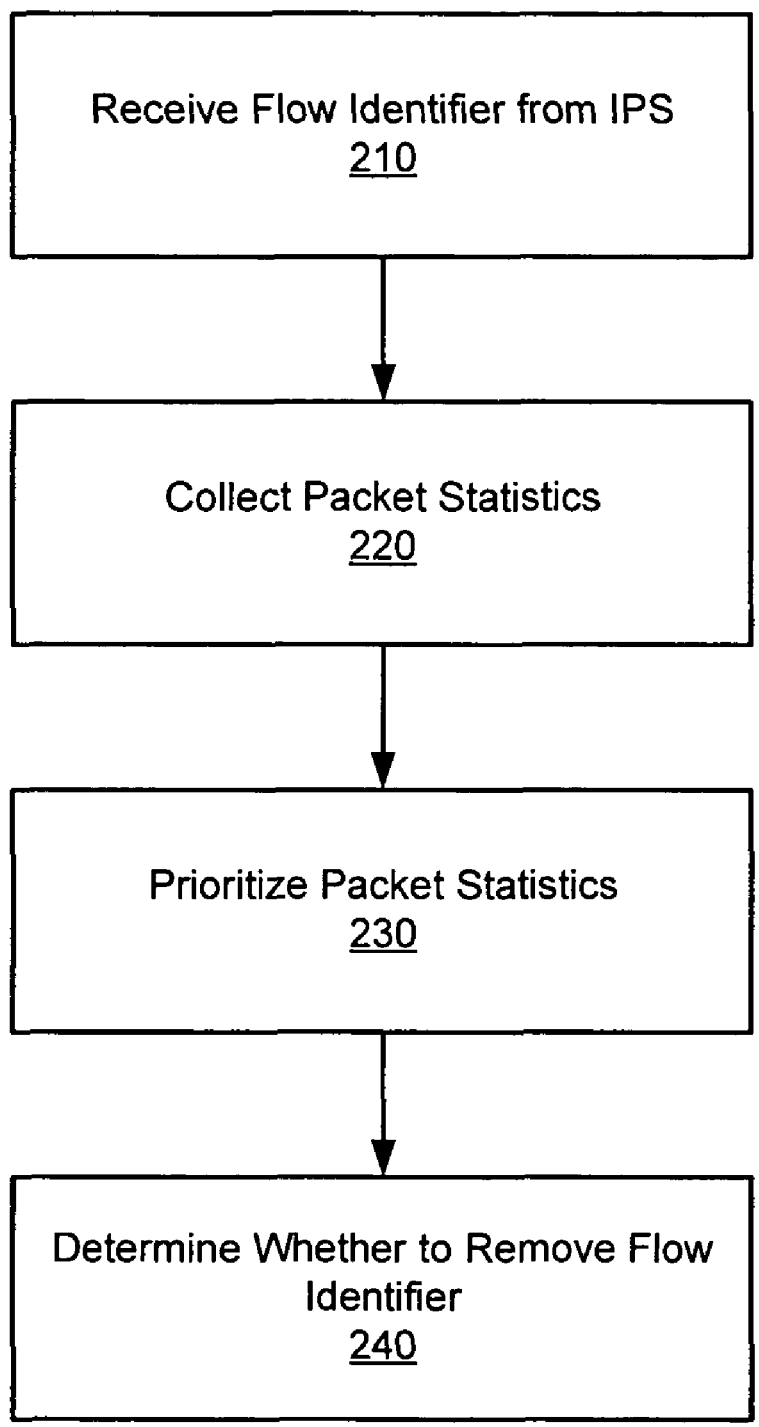
FIG. 2 is a flow diagram of an embodiment of the invention.

FIG. 2 illustrates another embodiment of the invention. A network switch (or other network device) receives a flow identifier from an external IPS device 210 and a storage request is made for the flow identifier. Flow identifiers may be stored in a cache, a memory, or other storage medium. When a flow identifier is stored in memory, it distinguishes the associated flow from other traffic flowing through a switch or network device. For example, in one embodiment, flow identifiers are stored to distinguish known good flows from unknown flows or from known network threats. In other embodiments, flow identifiers may be stored to differentiate between flows based on certain characteristics such as, for example, source and/or destination of the traffic, traffic types, traffic classes, etc. Thus, in one embodiment of the invention, if a flow identifier is stored in memory for a particular flow, packets associated with the flow are identified and forwarded directly through the switch without being redirected for further inspection.

The memory used for storing flow identifiers is of finite capacity. Thus, if a new flow identifier is received by the switch and the memory is full, a decision is made to determine whether to remove a flow identifier from the memory (and subsequently add the new flow identifier) or to reject the new flow identifier.

To facilitate the decision-making process, the switch, or other network device, collects packet statistics 220 for traffic flowing through the switch or other network node. These statistics can include cumulative packet counts for one or more flows, a change or delta in a packet count over a time interval, a ratio of two cumulative packet counts, and/or a ratio of a change or delta in two different packet counts over a time interval. In one embodiment, packet statistics are collected only for those flows having an associated flow identifier stored in memory. In other embodiments, packet statistics can be collected for a selected/desired group or subset of flows.

The collected packet statistics are analyzed based on a policy or set of rules. The policy or set of rules can be manually updated by a network administrator or it can be dynamically updated based on network conditions. Flows are then prioritized, 230, using the packet statistics and the policy (or set of rules). For example, in one embodiment, priority is determined using "packet count over time" statistics (i.e., higher priority is given to a high volume flow than to a low volume flow). In another embodiment, priority is determined based on the particular type of flow (e.g., mail traffic, FTP traffic, SQL traffic, etc.). Other priority schemes may also be used.

Once the flows have been prioritized, the system determines whether to remove a flow identifier from memory 240. The stored flow identifier having the lowest priority is selected and is compared against the flow identifier received from the IPS device. The flow-aging policy determines whether to keep the selected flow identifier (and deny entry to the received flow identifier) or to remove the selected flow identifier and add the received flow identifier to the memory. For example, the flow-aging policy may give priority to higher volume flows. Thus, if the flow associated with the selected flow identifier has a higher volume than the flow for the received flow identifier, the system will determine to keep the selected flow identifier and deny entry to the received flow identifier. On the other hand, if the flow associated with the selected flow identifier has a lower volume than the flow for the received flow identifier, the system will determine to remove the selected flow identifier and subsequently add the received flow identifier to the memory.

Embodiments of the invention described above may include hardware, software, and/or a combination of these. In a case where an embodiment includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc. The machine accessible medium may further include an electronic device having code loaded on a storage that may be executed when the electronic device is in operation. Thus, delivering an electronic device with such code may be understood as providing the article of manufacture with such content described above.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. The above descriptions of certain details and implementations, including the description of the figures, may depict some or all of the embodiments described above, as well as discussing other potential embodiments or implementations of the inventive concepts presented herein.

Besides what is described herein, various modifications may be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A method for aging network flows in a switch, comprising:

receiving, from an Intrusion Prevention System (IPS) device, a new network flow identifier for a new network flow, wherein the new network flow is in addition to a plurality of existing network flows communicatively interfaced through the switch;

collecting packet statistics for each of the plurality of existing network flows through the switch, each of the plurality of existing network flows having a corresponding network flow identifier stored in a memory of the switch;

prioritizing the plurality of existing network flows based at least in part on the packet statistics collected in view of a dynamic network flow-aging policy, wherein the dynamic network flow-aging policy prioritizes higher volume network flows among the plurality of existing network flows above lower volume network flows among the same plurality of existing network flows;

removing a network flow identifier stored in the memory of the switch corresponding to one of the plurality of existing network flows based at least in part on the prioritization of the plurality of existing network flows and the dynamic network flow-aging policy;

storing the new network flow identifier for the new network flow in the memory of the switch among the remaining network flow identifiers not removed from the memory of the switch that correspond to the plurality of existing network flows; and forwarding packets associated with any of the plurality of existing network flows having a corresponding network flow identifier stored in the memory of the switch and/or the new network flow having the new network flow identifier stored in the memory of the switch without redirecting the packets to the IPS device.

2. The method of claim 1, wherein the IPS device performs deep packet inspection upon packets to determine whether the packets associated with a particular network flow present a security threat, and wherein the method further comprises the IPS device notifying the switch that a particular network flow is a good network flow that does not represent a threat when no such threat is found through the deep packet inspection and further wherein the IPS device notifies the switch that a particular network flow is a bad network flow that represents a security threat when such a threat is found through the deep packet inspection.

3. The method of claim 1, wherein the plurality of existing network flows having a corresponding network flow identifier stored in the memory of the switch and the new network flow having the new network flow identifier stored in the memory of the switch are all identified by the IDS device as being good network flows that do not represent a threat pursuant to the deep packet inspection of the IDS device.

4. The method of claim 1, wherein collecting packet statistics for each of the network flows comprises maintaining at least one of a packet count over a specified period of time, a total packet count, a packet ratio for a network flow, a packet ratio between different network flows, and a rate of change of a network flow.

5. The method of claim 1, wherein prioritizing the packet statistics comprises comparing packet statistics for a first network flow against packet statistics for a second network flow.

6. The method of claim 1, wherein prioritizing the packet statistics comprises comparing a first packet count over a specified period of time for a first network flow against a second packet count over a specified period of time for a second network flow.

7. The method of claim 1, wherein removing the network flow identifier stored in the memory of the switch corresponding to one of the plurality of existing network flows based at least in part on the prioritization of the plurality of existing network flows and the dynamic network flow-aging policy comprises:
   receiving one or more results of prioritizing the plurality of existing network flows based on the packet statistics collected;
   selecting a lowest priority network flow identifier from the network flow identifiers stored in the memory based on the prioritization of the plurality of existing network flows; and
   determining, based at least in part on the dynamic network flow-aging policy, to replace the selected lowest priority network flow identifier with the received new network flow identifier.

8. The method of claim 1, wherein each network flow identifier comprises a 5-tuple of characteristics uniquely identifying each network flow, the 5-tuple comprising a source address, a destination address, a source port, a destination port, and a protocol for the corresponding network flow identified by the 5-tuple.

9. A network flow-aging manager for a network switch, comprising: a packet statistics unit to collect packet statistics for a plurality of existing network flows; a packet statistics analyzer coupled to the packet statistics unit to analyze the packet statistics according to a dynamic network flow-aging policy and prioritize the network flows in accordance with the dynamic network flow-aging policy, wherein the dynamic network flow-aging policy prioritizes higher volume network flows among the plurality of existing network flows above lower volume network flows among the same plurality of existing network flows; and a network flow selector coupled to the packet statistics analyzer to select a network flow for removal based at least in part on network flow priority and the dynamic network flow-aging policy and removing a network flow identifier corresponding to the selected network flow from a memory of the switch; the memory of the switch to store a new network flow identifier for a new network flow among a plurality of remaining network flow identifiers not removed from the memory of the switch which correspond to the plurality of existing network flows; and a packet forwarder to forward packets associated with any of the plurality of existing network flows having a corresponding network flow identifier stored in the memory of the switch and/or the new network flow having the new network flow identifier stored in the memory of the switch without redirecting the packets to an Intrusion Prevention System (IPS) device.

10. The network flow-aging manager of claim 9, wherein the packet statistics unit comprises a packet counter to count packets over time associated with each of the plurality of network flows.

11. The network flow-aging manager of claim 9, wherein the packet analyzer compares a first packet count over time for a first network flow against a second packet count over time for a second network flow.

12. The network flow-aging manager of claim 9, wherein the packet analyzer compares a packet count over time for a network flow against a threshold.

13. The network flow-aging manager of claim 12, wherein the threshold changes dynamically based at least in part on the packet statistics.

14. The network flow-aging manager of claim 9, wherein the packet analyzer determines a rate of change of packets in a first network flow and compares the rate of change to at least one of a threshold and a second rate of change of packets in a second network flow.

15. The network flow-aging manager of claim 14, wherein the threshold is determined, at least in part, by the dynamic network flow-aging policy.

16. The network flow-aging manager of claim 9, wherein the packet statistics analyzer further determines a ratio of incoming packets to outgoing packets for a network flow and wherein the packet statistics analyzer to further prioritize the network flows based on the determined ratio.

17. An article of manufacture comprising a non-transitory machine-accessible medium having content to provide instructions to result in an electronic device performing operations including: storing, in a memory, a network flow identifier for each of a plurality of network flows; maintaining packet statistics for each of the network flows; prioritizing the plurality of network flows based at least in part on the packet statistics in view of a dynamic network flow-aging policy, wherein the dynamic network flow-aging policy prioritizes higher volume network flows above lower volume network flows; selecting a network flow identifier for removal from the memory based at least in part on network flow priority and the dynamic network flow-aging policy; removing the selected network flow identifier from the memory; storing a new network flow identifier for the a network flow in the memory among the remaining network flow identifiers not removed from the memory; and forwarding packets associated with any of the plurality of existing network flows having a corresponding network flow identifier stored in the memory and/or the new network flow having the new network flow identifier stored in the memory without redirecting the packets to an Intrusion Prevention System (IPS) device.

18. The article of manufacture of claim 17, wherein storing a network flow identifier for each of the plurality of network flows comprises storing a source and destination address, a source and destination port, and a protocol for the each of the network flows.

19. The article of manufacture of claim 17, the medium having content to provide instructions to result in the electronic device performing further operations including maintaining packet counters over time for each of the plurality of network flows.

20. The article of manufacture of claim 17, the medium having content to provide instructions to result in the electronic device performing further operations including maintaining at least one of a packet count over a specified period of time, a total packet count, a packet ratio for a network flow, a packet ratio between different network flows, and a rate of change of a network flow.

* * * * *